3,331,772
DESALTING WATER BY REVERSE OSMOSIS THROUGH NOVEL SEMIPERMEABLE MEMBRANES
Eugene R. Brownscombe, Dallas, and Loyd R. Kern, Irving, Tex., assignors to The Atlantic Refining Company, Philadelphia, Pa., a corporation of Pennsylvania
No Drawing. Filed Aug. 3, 1965, Ser. No. 477,036
5 Claims. (Cl. 210—23)

This application is a continuation-in-part of application Ser. No. 201,819 filed June 12, 1962.

The present invention relates to new and improved semipermeable membranes and processes for their preparation. Another aspect of the invention relates to methods for repairing any type of semipermeable membrane. The invention also concerns desalinization of water by reverse osmotic processes employing the presently disclosed membranes.

Reverse osmosis is characterized by use of pressure in excess of osmotic pressure (approximately 350 p.s.i. for sea water) to force water through a selective membrane capable of rejecting salts dissolved therein. The process name is derived from the phenomenon whereby water under an applied pressure driving force flows in the opposite direction to that normally observed in osmosis where the driving force is the concentration gradient.

The reverse osmotic process has long been recognized as one that potentially could be operated at high thermodynamic efficiency. Other advantages are that operations can be conducted at ambient temperature, the simplicity of the process, etc.

However, desalinization of water by reverse osmosis as of yet has failed to prove competitive with other saline water conversion processes. This is largely because satisfactory economical membranes have not been developed. Present membranes have rather small surface areas which limit the production (transfer) of water. They are expensive and difficult to prepare. Conventional membranes are short-lived. Further, there is no convenient procedure for repairing leaks that develop with use. This is serious because even a small opening in the membrane can contaminate a large flow of product.

Accordingly, it is an object of the present invention to provide new and improved semipermeable membranes suitable for use in desalting water by reverse osmosis.

Another object of this invention is to provide semipermeable membranes which are unrestricted with regard to surface area and can be formed to have any desired dimensions.

Another object is to provide semipermeable membranes which are long-lived and can readily be repaired should the need arise.

Another object is to provide a general technique which is suitable for repairing semipermeable membranes regardless of their construction.

Still another object is to provide an improved method for desalinization of water by reverse osmosis.

These objects as well as other objects and advantages which will be apparent from the following description of the invention have been accomplished by the preparation of semipermeable membranes comprised of numerous discrete particles of osmotic material as opposed to conventional membranes which are unitary and undivided. These novel membranes are prepared on porous supports according to special filtration processes detailed below. Also, a novel method for repairing semipermeable membranes is presented as well as an improved method for desalting water by the technique of reverse osmosis.

The osmotic material for our novel membranes can be any suitable water insoluble material which can form a barrier impermeable to dissolved salts in water. One possibility would be to use a substance containing an ionic charge that would prevent passage of ions. Such a membrane would restrict the ions of one charge by the presence of active sites of the same charge; the fact that the movement of one set of ions is limited in its ability to pass through the membrane would likewise limit the flow of ions of the opposite charge. Examples of such "ion exclusion materials" are clays, resins, etc., having a high fixed ion concentration.

Especially preferred materials for this purpose are the clays. "Clays" are fine-grained rock material composed predominantly of silica, alumina, and water. Iron, alkalies, and alkaline earths are also often present in appreciable quantities. Suitable clay materials include the montmorillonite group, the kaolinite group, the halloysite group, vermiculites, illites, and the chlorite group. Of these the montmorillonites such as the bentonites have particular utility.

The resins referred to may be natural or synthetic organic substances which are polymeric in nature. Prime examples of resins suitable as ion exclusion materials include carbohydrates, gums, sulfonated polystyrene, chloromethylated polystyrene, etc. Particularly preferred among the carbohydrates are polysaccharides such as starch and cellulose.

Where desired, the ion exclusion type osmotic materials may be treated with chemicals such as alkali salts of polyacrylates or metallic salts of lignosulfonates. Chemicals of this type are adsorbed by the ion exclusion type osmotic materials thereby increasing the charge concentration on their surface.

Another possibility would be to use an osmotic material of the type where separations depend mainly on the ability of water to solvate active sites on a membrane formed of the material. Salt ions are rejected because the bound water has little solution capability. Such substances may be termed "water solvating materials" and are generally synthetic plastics of large molecular weight.

Examples of osmotic materials which fall within the above category include cellulose acetate, cellulose propionate, cellulose acetate propionate, cellulose acetate butyrate, polyvinyl alcohol, polyvinyl acetate, polystyrene, polycarbonates, etc.

Osmotic materials of the water solvating type may be treated with a membrane salt (swelling agent) in an amount sufficient to catalyze swelling. Examples of suitable salts include boron trifluoride etherate, sodium periodate, magnesium perchlorate, etc. Also, it may be desirable to add a finely divided water insoluble material in an amount sufficient to plug the spaces which may exist between the individual particles of water solvating material when formed as a membrane. Preferably one of the ion excluding materials mentioned above, e.g., clays, resins, etc., is used as the plugging agent.

As already noted, the presently disclosed semipermeable membranes are composed of numerous discrete particles rather than formed as integral films or sheets. The diameter of at least one dimension of these particles should be less than about $100\mu$ and preferably less than $10\mu$. In other words, there is a maximum cross-sectional thickness of the size noted in at least one direction. Also, a minimum size restriction is imposed. The finely divided particles should have an average diameter greater than about $0.10\mu$ and preferably greater than $1.0\mu$. Membranes prepared from particles much larger than about $100\mu$ in over-all size have reduced efficiency for demineralizing water while membranes comprised of particles smaller than about $0.10\mu$ have reduced flow rates (due to low permeability).

The membrane material may be prepared in the finely divided form by any of a number of size-reducing techniques or may be formed from solution by precipitation. However prepared, the finely divided osmotic material is suspended in a liquid which acts as a nonsolvent. Water is preferred for this purpose, however, organic liquids can also be used.

After the resulting suspension is agitated over an interval sufficient to ensure that the dispersion is substantially homogeneous, the slurry is filtered on a selected porous support. The liquid passes through the support medium as filtrate and the particulate membrane material is deposited as a filter cake or layer on the surface of the support. The support medium should be readily permeable to water and must be capable of filtering the finely divided osmotic material. Suitable support materials, for instance, are paper, cloth, coarse clays, sandstone, ceramics, finely woven metal mesh, perforated metal, etc.

The deposited membrane material should be compressed to reduce pore space and increase its strength. A preferred technique involves subjecting the membrane to an applied pressure of from about 5 to 10 times the pressures which be encountered during the reverse osmotic process. Normally, pressures of about 1 to 5 thousand p.s.i. suffice for this purpose and significantly increase the effectiveness of the membrane for desalting operations.

The thickness of the mat or layer of osmotic material on the support medium should not much exceed the minimum thickness which gives an adequate degree of demineralization. Membranes which are unnecessarily thick provide water at reduced rates of production. The optimum thickness in each case will depend on the character of the osmotic material, the dimensions of the constituent particles, the nature of the porous support, the salinity of the feed solution, the extent to which the membrane is compressed, etc. Generally, a convenient rule of thumb is to require that the film thickness be less than about 10 mm. and preferably less than 1.0 mm.

After the membrane has been formed, it should be preserved by continuing to maintain the membrane under at least a small applied pressure, e.g., one hundred p.s.i. This ensures that the membrane stays firmly pressed against the support member. Also, the membrane should always be kept moist with a liquid to prevent drying out and cracking.

Should the need arise, the presently disclosed membranes can be repaired in situ merely by introducing additional particulate membrane material to a feed solution which is pressured through the membrane. This will serve to cover all microscopic holes, cracks, etc.

This same technique may be used for repairing conventional (cast) semipermeable membranes. A suspension of finely divided osmotic material is added to the feed solution input to the membrane cell and the particulate material is deposited on the surface of the semipermeable membrane. If necessary, some large, inert particles can be added to bridge and facilitate the plugging of larger holes. Repair can be effected while desalting operations are being carried out so that production need not be interrupted.

Another aspect of the present invention concerns demineralizing saline water by reverse osmotic procedures using the disclosed semipermeable membranes. Saline water is introduced through an input channel or opening connected to the unsupported side of the special membrane. Pressure is applied to the saline water in excess of its osmotic pressure, e.g., on the order of 350 to 1000 p.s.i. Water of reduced salt content is withdrawn from the other (supported) side of the membrane after passing through the membrane and the porous support. Concentrated or waste brine passes through an output channel connected to the unsupported side of the membrane.

For large scale operations, it is preferred that the membrane material be deposited in a series of perforated metal tubes or pipes which may be lined with a screen overlain with a filter paper. The membrane material should cover the entire inside surface of each pipe. Saline water is forced into the pipe at one end; water of reduced salt content passes through the membrane material and exits through the perforations; and waste brine is produced from the other (remote) end of the pipe.

Alternatively, the membrane material may be deposited within a subsurface fracture as disclosed in the parent application.

Membranes comprised of numerous discrete particles offer many important advantages over conventional unitary membranes including:

(1) Our membranes can be constructed to have any desired surface area.
(2) These new membranes are simple and inexpensive to prepare.
(3) They can readily be repaired and are long-lived.
(4) They are capable of producing potable water (less than 500 p.p.m. of dissolved solids) from sea water and brackish water.

By water of summary, the present invention consists of the following ideas or inventive concepts:

(1) Novel semipermeable membranes characterized as being comprised of numerous discrete particles.
(2) A process for preparing semipermeable membranes comprised of numerous discrete particles.
(3) A method for repairing any type of semipermeable membrane suitable for use in a reverse osmotic procedure for desalting water, i.e., the special membranes herein disclosed or conventional (cast) membranes.
(4) A method for desalinization of water by reverse osmosis using semipermeable membranes comprised of numerous discrete particles.

EXAMPLE I

*Preparing the membrane*

Finely divided bentonite having the particle size set forth in the specification is used as the membrane material. The bentonite is treated with sodium polyacrylate, suspended in water, and agitated until well-mixed. The bentonite thus prepared is then deposited as a sheet of discrete particles on a porous support which is permeable to water. Pressure filtration accomplishes this end by interposing the porous medium in such a way that the bentonite is retained while the liquid filtrate (water) passes through the pores of the support. The bentonite membrane is compressed by a fluid under an applied pressure of several thousand p.s.i. The thickness of the membrane thus formed is less than the maximum value stated in the specification.

By a similar procedure semipermeable membranes are prepared from sulfonated polystyrene, cellulose acetate, and cellulose acetate propionate. Materials used as porous supports are perforated metal plates and tubes, filter paper, sandstone, and wire mesh screens.

EXAMPLE II

*Repairing semipermeable membranes*

When leaks or holes develop in the membranes prepared according to Example I, the membranes are repaired by pressuring a slurry of finely divided membrane material through the damaged membrane. Preferably, the material used for patching or coating the membrane is the same as the original membrane material; however, dissimilar materials may be employed where desired. Repair may involve forming a second layer on the original membrane but all that is necessary is that the holes or flaws be filled or covered.

This repair procedure is not restricted to membranes comprised of numerous discrete particles but is equally applicable to conventional semipermeable membranes. Thus, a cast cellulose acetate membrane may be repaired by depositing a layer of particulate osmotic material on its surface.

EXAMPLE III

*Desalinization of water by reverse osmosis*

Various demineralization techniques employing the novel membranes of this invention are possible.

In the preferred procedure, a length of perforated pipe lined with screen and paper is used as the desalinization cell. Finely divided osmotic material is deposited within the pipe according to Example I.

Saline water is introduced through the feed solution inlet connected to one end of the pipe. A pressure greater than the osmotic pressure is applied to the feed solution. Water of reduced salt content passes through the membrane material and through the pores in the pipe. Concentrated brine passes to outlet means at the remote end of the pipe and is withdrawn.

What is claimed is:

1. A semipermeable membrane in combination with a porous supporting medium where said membrane is comprised solely of numerous discrete particles of osmotic material of the ion exclusion type selected from the group consisting of clays and resins formed as a thin layer on said supporting medium, which said particles have a diameter between about $100\mu$ and $0.10\mu$.

2. A semipermeable membrane in combination with a porous supporting medium where said membrane is comprised solely of numerous discrete particles of osmotic material of the water solvating type formed as a thin layer on said supporting medium, which said particles have a diameter between about $100\mu$ and $0.10\mu$.

3. A process for producing a semipermeable membrane of osmotic material on a permanently associated porous supporting medium comprising (a) preparing an aqueous suspension of a finely divided osmotic material composed of particles having a diameter between about $100\mu$ and $0.10\mu$, (b) pressuring said suspension through said supporting medium to form a thin continuous layer on said supporting medium composed of numerous discrete particles of said osmotic material, and (c) maintaining said membrane under at least a nominal applied fluid pressure to hold said layer in position against said supporting medium.

4. A process according to claim 3 where said layer of osmotic material is compressed by applied fluid pressure of from about 5 to 10 times the maximum pressure which will likely be employed during any reverse osmotic operation for desalting water.

5. A method for plugging holes in a semipermeable membrane contained on a porous supporting medium during a reverse osmotic operation for desalting water comprising (a) preparing an aqueous suspension of a finely divided osmotic material composed of particles having a diameter between about $100\mu$ and $0.10\mu$, (b) introducing said suspension to the saline water being desalted, and (c) depositing said osmotic material under applied fluid pressure so as to cover the holes in said membrane.

References Cited

UNITED STATES PATENTS

| | | | |
|---|---|---|---|
| 2,411,238 | 11/1946 | Zender | 210—22 |
| 3,009,578 | 11/1961 | Foote et al. | 210—500 X |
| 3,170,867 | 2/1965 | Loeb et al. | 210—22 |
| 3,250,703 | 5/1966 | Levendusky | 210—38 |

MORRIS O. WOLK, *Primary Examiner.*

E. G. WHITBY, *Assistant Examiner.*